3,149,405
METHOD OF MAKING OILLESS BEARINGS
William G. Dolan, 1220 Douglas Ave., Flossmoor, Ill.
Filed Nov. 24, 1961, Ser. No. 154,486
3 Claims. (Cl. 29—149.5)

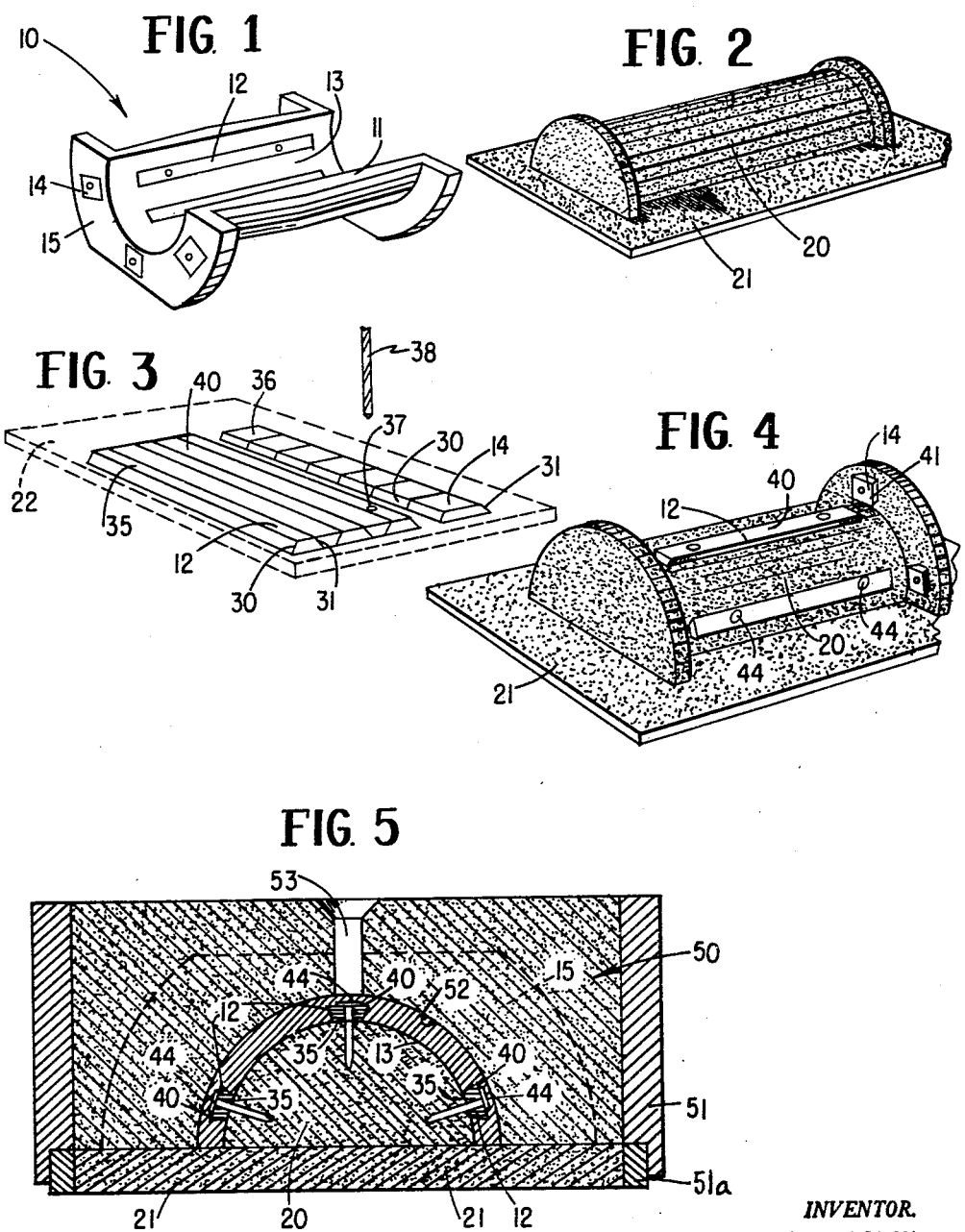

This invention relates in general to a bearing construction and more particularly relates to an improved method of manufacturing an oilless bearing.

It is an object of the present invention to provide a new and improved method of manufacturing oilless bearings.

It is another object to provide a method of manufacturing oilless bearings of the type having lubricating material embedded in a bearing material.

It is still another object to provide a method of casting a bearing from bearing material wherein lubricating material is embedded in the bearing material adjacent a bearing surface.

It is yet another object to provide a method of manufacturing oilless bearings which is substantially less expensive than other methods heretofore utilized.

It is a further object to provide a method of casting, in finished form, an oilless bearing embodying a relatively unyielding graphite member of substantially high hardness.

It is yet a further object to provide a method of this character which finds application in the manufacture of a greater variety of oilless bearing constructions than generally similar methods heretofore utilized.

The above and other objects are realized in accordance with the present invention by providing a new and improved oilless bearing and method of its manufacture. The invention contemplates casting bearing material around relatively hard, non-yielding lubricating material to form an oilless bearing which is ready to be used when it is broken out of a conventional mold. Lubricating material in a relatively hard block or sheet is formed into members having any desired shape and affixed to a mold form so as to extend into a mold cavity in a predetermined manner. When molten bearing material is poured into the cavity and allowed to harden, the lubricating members are embedded in the bearing material with lubricating surfaces substantially flush with, and forming a part of, a bearing surface. The properties of the lubricating material and the configuration of each lubricating member are such that the lubricating material remains embedded in the casting regardless of the rigors of the service life of the bearing.

The invention, both as to its organization and method of operation, taken with further objects and advantages thereof, will best be understood by reference to the following description taken in connection with the accompanying drawings, in which:

FIGURE 1 is a perspective view of an oilless bearing embodying the features of the present invention;

FIGURE 2 is a perspective view of a conventional mold core and mold base for casting the bearing illustrated in FIGURE 1;

FIGURE 3 is a perspective view of a sheet of lubricating material illustrating the formation of various lubricating members;

FIGURE 4 is an enlarged perspective view of the mold core and mold base illustrated in FIGURE 2 showing lubricating members secured to the mold core prior to setting a mold shell in place and pouring molten material into the mold; and FIGURE 5 is an enlarged transverse sectional view through a closed mold and the oilless bearing shown in FIGURE 1, immediately after casting.

Referring generally to the drawings and particularly to FIGURE 1, an oilless bearing embodying the features of the present invention is illustrated generally at 10. The bearing 10 comprises a casting 11 formed of bronze bearing material and in which is embedded a plurality of lubricating members 12 and 14. The members 12 are flush with the journal bearing surface 13 of the casting 11, while the members 14 are embedded in the bronze flush with the thrust bearing surface 15. The lubricating members 12 and 14 are composed of a graphite material which is characteristically relatively hard and unyielding. The members 12 and 14 are cast into the bronze bearing material when the casting 11 is formed.

Due to their relatively high hardness and, in addition, due to their below described configuration, the lubricating members 12 and 14 are securely retained in the bronze bearing material of the casting 11 for an extended period of time under the most rigorous operating conditions. It will be understood, of course, that the use of bronze for the casting 11 is intended to be merely exemplary and the bearing material might be composed of another alloy.

It is generally old, of course, to embed graphite lubricating material or the like in the bearing surfaces of conventional bearings. For example, it has heretofore been proposed to make an oilless bearing by providing the bearing surfaces of a metal bearing with recesses in which a plasticized graphite composition is packed. It has further been suggested, as disclosed in the Hammer patent, No. 2,305,001, issued December 15, 1942, to cast a bearing around a solid core of hard graphite having a generally helical thread cut in its periphery. The core of the bearing is then reamed out leaving a thread of graphite which is retained in and flush with the bearing surface in depressions formed in the casting by the peripheral configuration of the solid core.

Each of the aforedescribed methods and/or their oilless bearing products have serious handicaps, however. Where a plasticized graphite composition is utilized, for example, the composition has a tendency to disintegrate at high temperatures because of the instability of the binders which must be normally utilized. The oilless bearing disclosed in the aforedescribed Hammer patent is relatively expensive to manufacture, as can well be understood in view of the involved method of manufacture, including, for example, the reaming out of substantially the entire core of lubricating material. Furthermore, the graphite threads are retained in the bearing surface solely through their rigidity and a certain amount of interference between the hard graphite and the walls of the depression in which they are seated. As a consequence, when a portion of a thread is damaged it tends to come out of the recess.

In contrast, as has been pointed out, the oilless bearing 10 embodying the features of the present invention, by virtue of its method of manufacture, is relatively inexpensive. In addition, the lubricating members 12 and 14, are, because of their composition and unique configuration, securely retained in the casting 11 for a substantial period of time under severe service conditions, including high temperatures. Furthermore, the lubricating material can easily be formed in any desired shape and positioned at any predetermined place in the casting 11.

The method embodying the present invention utilizes a mold core 20 and a mold base 21 illustrated in FIGURE 2. The mold core 20 might be composed of any conventional core material, such as green sand, for example. It is formed with a pattern, by conventional molding techniques, on the mold base 21, which is also preferably a green sand composition.

As seen in FIGURE 3, the lubricating members 12 and 14, of predetermined configuration, are cut out of a sheet of lubricating material 22, which is preferably a hard graphite having deformation resistant properties. The lubricating members 12 and 14 are cut in any desired shape, of course, depending upon their anticipated use in a specific bearing construction. It is significant, however, that bevelled edges 30 and 31 are cut on the oppositely disposed sides of the lubricating members 12 and 14 so that each of the lubricating surfaces 35 and 36, respectively, of the lubricating members 12 and 14, have lesser widths than their opposite surfaces 40 and 41. The bevelled edges 30 and 31 effectively retain the lubricating members 12 and 14 securely in the bearing material when the bearing material has been cast around the lubricating members to form the casting 11.

When the lubricating members 12 and 14 are formed from the sheet 22 of hard graphite, holes 37 are preferably drilled in each member with a conventional drill 38 to facilitate securing the members to the mold core 20 prior to pouring the casting 11. These holes 37 permit the lubricating members 12 and 14 to be nailed to the surface of the core 20 to hold them in place while the casting 11 is being poured.

Referring now to FIGURE 4, it will be seen that the lubricating members 12 and 14 are nailed to the surface of the mold core 20 in predetermined positions in accordance with the lubricating demands of the installation. The lubricating members 12 and 14 are secured to the core 20 with their lubricating surfaces 35 and 36, (see FIGURE 3) respectively, flush against the surface of the core while their wider bottom surfaces 40 and 41, (see FIGURE 4) respectively, extend outwardly. The members 12 and 14 are shown in FIGURE 4 secured to the surface of the core 20 by bronze nails 44 which extend through the holes 37 drilled in the members 12 and 14. It should be understood, however, that the lubricating members 12 and 14 might be secured to the core 20 in other ways. For example, an appropriate adhesive might be utilized to fasten the lubricating members 12 and 14 in place.

Once the lubricating members 12 and 14 have been properly secured to the mold core 20, a conventional mold shell 50 having a wall enclosure 51 is placed over the mold core in a well known manner, as illustrated in FIGURE 5. The mold shell 50 is also composed of any known molding material, such as green sand, for example. Joining the mold core 20 and the mold shell 50 together within an open topped box formed by a conventional frame 51a (only partially shown) surrounding the sand mold base 21, and the mold shell wall 51, is effective to form a molding cavity 52, as might be expected. At this point, the molten bearing material, which is preferably bronze, is poured into the pouring hole 53 in the mold shell 50 to fill the molding cavity 52.

The molten bronze solidifies to form the oilless bearing 10 which includes the casting 11 and the lubricating members 12 and 14. The lubricating surfaces 35 and 36 of the lubricating members 12 and 14, respectively, extend in substantially co-extensive relationship with, and form a part of, the journal bearing surface 13 and the thrust bearing surface 15, respectively, of the bearing 10. In this light, since the surfaces 35 and 36 of the lubricating members 12 and 14, respectively, are generally flat when the lubricating members are formed, it is preferable that they be pressed slightly into the surface of the molding core 20 when they are initially secured to the core. This causes the lubricating surfaces 35 and 36 to extend slightly above the bearing surfaces 13 and 15, respectively, of the casting 11 to positively assure that the rotary element (not shown) supported by the bearing 10 is initially lubricated.

A straight-forward bearing design is embodied in the oilless bearing 10. However, relatively complex bearing configurations can readily be cast by the method embodying the features of the present invention. Moreover, the lubricating members can be readily cut to any configuration and placed in any prescribed pattern throughout the bearing, depending upon the desired configuration of the bearing itself and upon the desired lubricating qualities of the bearing.

The sand molding shell 50 and molding core 20 are subsequently broken away from the hardened casting 11 in a well known manner. This, of course, leaves the nails 44 extending outwardly from the journal bearing surface 13 and the thrust bearing surface 15. The nails 44 are preferably formed of a bronze, however, as has been pointed out, and can readily be snipped off substantially flush with the lubricating surfaces 35 and 36 of corresponding lubricating members 12 and 14, respectively. Where the lubricating members are secured to the mold core by an adhesive, for example, the nails, of course, are not a factor.

It has been established that the oilless bearing 10 formed in accordance with the method embodying the features of the present invention is designed to have a long service life under extreme operating conditions. The lubricating members 12 and 14 are embedded in the casting 11 with their lubricating surfaces 35 and 36, respectively, generally co-extensive with and forming a part of the bearing surfaces 13 and 15, respectively. Further, since each lubricating member has a trapezoidal cross section with its base embedded in the casting 11, the lubricating members 12 and 14 are securely held in place and cannot bodily slip out of embedded relationship with the casting 11. In addition, because of the trapezoidal shape of the members 12 and 14, progressively greater lubricating areas are exposed as the casting 11 becomes progressively more worn with the result that even greater lubrication is provided by the bearing 10. Finally, because the lubricating members 12 and 14 are formed of a substantially hard, deformation resistant graphite, rather than a moldable plasticized graphite material, for example, the lubricating material does not disintegrate when subjected to extremely high temperatures.

Because it is not necessary to machine the hard graphite, as is the case with the method disclosed in the aforedescribed Hammer patent, for example, the graphite material used for the lubricating members 12 and 14 obviously need not be machinable. Without such a limitation, it is possible to select a hard graphite lubricating material from a greater number of graphite material compositions which have a much wider range of properties and other desirable characteristics.

It will also be obvious, of course, that the configuration of the lubricating members 12 and 14 might vary from a generally trapezoidal cross sectional shape, as illustrated, and still fall within the scope of the present invention. For example, the lubricating members 12 and 14 might be T-shaped with the cross bar of the T buried in the bearing material. It is significant that only a portion of the body of each lubricating member 12 and 14 be wider than the lubricating surfaces 35 and 36, respectively, of the lubricating members. Any configuration which conforms to this standard is effective to retain the lubricating members 12 and 14 embedded in the casting 11 for a substantial period of time.

In addition, the shape of the lubricating surfaces 35 and 36, for example, might be varied almost at will to establish desirable lubricating characteristics for a bearing 10. Similarly, the lubricating members 12 and 14 can be arranged in an infinite number of patterns on the thrust bearing surfaces, the journal bearing surfaces, or any other bearing surfaces of the bearing 10 to obtain the optimum lubrication required in any installation.

It will also be seen that conventional molding equipment, procedures and techniques are readily utilized without modification in the method embodying the features of the present invention. The straightforwardness and flexibility of this method is responsible to a large extent to the inexpensive characteristic of the bearing 10 itself.

While an embodiment described herein is at present considered to be preferred, it is understood that various modifications and improvements may be made therein, and it is intended to cover in the appended claims all such modifications and improvements as fall within the true spirit and scope of the invention.

What is desired to be claimed and secured by Letters Patent of the United States is:

1. A method of making an oilless bearing, comprising the steps of; forming a hard unitary body of graphite lubricating material having a substantially planar lubricating surface on one side thereof and a body portion away from said lubricating surface which has a cross-sectional area greater than said lubricating surface in a plane parallel to the plane of said lubricating surface, seating said body of lubricating material on a mold form comprised of deformable material of the character of molding sand or the like, pressing said lubricating surface slightly into said deformable material, securing said body to said mold form, forming a mold cavity over said mold form and around said unitary body of lubricating material, and pouring molten bearing metal into said cavity to form a bearing having a bearing surface which includes said lubricating surface slightly raised therefrom, whereby said unitary body of graphite lubricating material is securely retained in said bearing.

2. The method of claim 1 further characterized by and including the step of forming retaining holes in said lubricating body prior to seating said body on said mold form, and securing said lubricating body to said mold form by passing nailing members formed of bearing material or the like through said apertures into said mold form.

3. The method of claim 2 further characterized in that said nailing members comprise nails formed of bearing material such as bronze or the like, the heads of said nails being snipped off substantially flush with said lubricating surface after the bearing has been formed.

References Cited in the file of this patent

UNITED STATES PATENTS

| | | |
|---|---|---|
| 889,971 | Voorhis | May 26, 1908 |
| 1,045,908 | Thacher | Dec. 3, 1912 |
| 1,200,245 | Sevel | Oct. 3, 1916 |
| 1,266,381 | Bache | May 14, 1918 |
| 2,305,001 | Hammer | Dec. 15, 1942 |
| 2,350,854 | Whiteley | June 6, 1944 |
| 2,728,619 | Haller | Dec. 27, 1955 |
| 2,894,792 | Brilli | July 14, 1959 |